US006976818B2

(12) United States Patent
Levey et al.

(10) Patent No.: US 6,976,818 B2
(45) Date of Patent: Dec. 20, 2005

(54) THREADED FASTENER PARTICULARLY SUITED FOR PLASTICS

(75) Inventors: Kenneth R. Levey, West Chicago, IL (US); Frank W. Bechtel, Jr., Roscoe, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/768,287

(22) Filed: Jan. 30, 2004

(65) Prior Publication Data

US 2004/0184897 A1 Sep. 23, 2004

Related U.S. Application Data

(63) Continuation-in-part of application No. 10/600,195, filed on Jun. 20, 2003.

(60) Provisional application No. 60/402,772, filed on Aug. 12, 2002.

(51) Int. Cl.[7] .................... F16B 35/04; F16B 39/284
(52) U.S. Cl. .................... 411/412; 411/411; 411/310; 411/311
(58) Field of Search .................. 411/309, 310, 311, 411/412, 413, 418, 420, 411

(56) References Cited

U.S. PATENT DOCUMENTS

| | | | |
|---|---|---|---|
| 113,557 A | 4/1871 | Pearson | |
| 2,601,651 A | 6/1952 | Wandy | 411/306 |
| 3,339,389 A | 9/1967 | Mosow | |
| 3,661,194 A | 5/1972 | MacFarlane et al. | 411/311 |
| 3,937,119 A * | 2/1976 | Ernst | 411/311 X |
| 3,972,360 A | 8/1976 | Cadwallader | 411/310 |
| 3,982,575 A | 9/1976 | Ollis, Jr. et al. | 411/310 |
| 4,273,175 A | 6/1981 | Capuano | 411/168 |
| 4,411,147 A | 10/1983 | Capuano | 72/220 |
| 4,576,534 A | 3/1986 | Barth et al. | 411/412 |
| 4,653,968 A | 3/1987 | Rapata et al. | 411/247 |
| 4,655,661 A * | 4/1987 | Brandt | 411/412 X |
| 4,810,149 A | 3/1989 | Lee et al. | 411/411 |
| 5,044,853 A | 9/1991 | Dicke | 411/311 |
| 5,569,009 A * | 10/1996 | Suzuki | 411/413 |
| 6,336,779 B1 | 1/2002 | Jakob et al. | 411/175 |
| 6,419,435 B1 * | 7/2002 | Gaudron | 411/412 |
| 2002/0081171 A1 | 6/2002 | Werner et al. | 411/423 |

FOREIGN PATENT DOCUMENTS

| | | | | |
|---|---|---|---|---|
| DE | 2240528 | * | 3/1974 | 411/413 |
| DE | 44 37 798 A1 | | 4/1995 | |
| DE | 198 487 717 | | 4/2000 | |
| DE | 199 20 616 A1 | | 12/2000 | |
| EP | 0 071 844 A2 | | 7/1982 | |
| EP | 0 133 773 | | 7/1984 | |
| GB | 2 046 862 A | | 3/1980 | |
| WO | WO 00/68585 | | 11/2000 | |

* cited by examiner

Primary Examiner—Katherine Mitchell
(74) Attorney, Agent, or Firm—Mark W. Croll; Paul F. Donovan

(57) ABSTRACT

A male threaded fastener particularly suited for use in plastics has a high thread and a low thread. Depressions are provided in the pressure flank of the high thread. Dimensional relationships are defined for scaling the fastener to commonly accepted sizes.

24 Claims, 3 Drawing Sheets

THREADED FASTENER PARTICULARLY SUITED FOR PLASTICS

CROSS-REFERENCE TO RELATED APPLICATIONS

The present application is a continuation-in-part of U.S. patent application Ser. No. 10/600,195, filed Jun. 20, 2003, which claims the benefit of U.S. Provisional Patent App. No. 60/402,772, filed Aug. 12, 2002.

FIELD OF THE INVENTION

The present invention relates generally to threaded fasteners, and, more particularly, the invention relates to male threaded fasteners particularly suitable for use in soft materials such as plastics.

BACKGROUND OF THE INVENTION

A variety of fastener configurations have been used for anchoring in soft materials, such as plastics, with varying success. Many fasteners are used in thread forming applications. A pilot hole is formed in the anchoring body, and the fastener threads cut into the wall of the pilot hole as the fastener is inserted.

Different materials present different challenges for the design of fasteners to be anchored therein. A feature of many plastics, referred to as "plastic creep", makes it difficult to permanently anchor in the material. Plastic creep refers to the dimensional changes that occur over time in a plastic body. It is also referred to as cold flow, and the rate of creep or cold flow often increases with increased temperature. As a result of plastic creep, a joint formed by a threaded fastener anchored in a plastic body can loosen over time. In the past, fastener designs have attempted to compensate for the effects caused by plastic creep, with varying success.

A conventional screw thread can be viewed as an inclined ramp in cylindrical form. As a screw is tightened down, the material in which the screw is driven rides up the ramp and is pulled against the screw head. During final tightening, he material is compressed, the screw itself is stretched and clamping load is generated. If the material relaxes overtime, such as occurs in plastic creep, the material has a natural tendency to slide down the inclined ramp of the screw thread. Clamp load is lost, and the joint loosens.

Difficulties also have been experienced in anchoring threaded fasteners in plastic bodies that are subjected to vibration. Vibration can cause the material to move on the inclined ramp of the screw thread, naturally in the direction of loosening. Thus, it can be difficult to retain a prescribed torque tightening of a threaded fastener in a plastic body.

Due to the nature of plastics, and the structures often made therefrom, it is preferred that a fastener drive into the material relatively easily. However, another problem occurs if the "drive-strip window" is small. The drive-strip window is the difference between the torque necessary to drive the screw in the material and maximum torque that can be tolerated on the tightened screw in the material before strip-out occurs in the anchoring material. Large drive-strip windows are desirable to prevent inadvertent strip-out, especially if powered drivers are used to drive the fastener into the material.

Screws are provided in a variety of sizes, both diameter and length. It has been common to provide screws of specific diameters with common thread pitches. However, in doing so it has become known that a screw of one size may work reasonably well in plastic, while a next size larger or smaller having the same general thread design does not work as well. Thus, it has been difficult to design screws of different sizes to work equally well in similar materials.

What is needed in the art is a threaded fastener for plastics and other soft materials which drives into the material easily yet provides a secure joint with improved retention even when experiencing plastic creep or vibration. It is further needed to provide a thread design that can be scaled to provide consistently improved performance with a variety of screw sizes.

SUMMARY OF THE INVENTION

The present invention provides a male threaded fastener having dual spaced threads of alternating high and low configuration to minimize material displacement while reducing internal stress and increasing tensile load required for pullout. Pressure flank features are provided on at least some threads to work in cooperation with plastic creep to improve retention and minimize loosening of the fastener in the soft anchoring material. Specific relationships are provided in thread height and spacing to achieve improved performance in plastic, consistent among screws of different sizes.

In one aspect thereof, the present invention provides a male threaded fastener with a shank having a head end and a distal end. A first thread spirally wraps the shank and ascends on the shank from the distal end towards the head end. A second thread spirally wraps the shank and ascends on the shank from the distal end toward the head end. The first thread has a drive flank facing the distal end and a pressure flank facing the head end. A series of depressions are formed in the pressure flank.

In another aspect thereof, the present invention provides an assembly of a screw in a pilot hole of a plastic work piece, with the pilot hole having a pilot hole wall in the work piece. The screw has a shank with a diameter. A high thread on the shank defines a first major diameter of the screw, and has a high thread pressure flank and a high thread drive flank defining an included angle of between about 35° and about 60°. The screw has a low thread on the shank defining a second major diameter of the thread that is less than the first major diameter. The low thread has a low thread pressure flank and a low thread drive flank defining a low thread included angle of between about 30° and about 120°. The high and low threads having substantially flat crests having widths. The high and low threads are spaced on the shank by a groove flat distance. The assembly satisfies the relationship: $A_2 \leq A_1$ when $A_1$ is the area of a substantially trapezoidal first region of the high thread defined in a plane containing an axis of the screw. The first region is substantially one-half of the area of the high thread that is embedded in the anchoring material. $A_2$ is the area of a second substantially trapezoidal region defined in the plane between the high thread and the low thread from the groove flat to the pilot hole wall.

In still another aspect thereof, the present invention provides a male threaded fastener with a shank having a head end and a distal end, the distal end defining the leading end of the fastener. A high thread spirally wraps the shank and has a drive flank facing the distal end and a pressure flank facing the head end. The high thread flanks define a high thread included angle of between about 35° and about 60°. A low thread spirally wraps the shank and has a low drive flank facing the distal end and a low thread pressure flank facing the head end. The low thread flanks define a low thread included angle of between about 30° and about 120°. The high and low threads each have flat crests between about 0.002 and about 0.010 inch wide. The high and low threads are spaced from each other on the shank by a groove flat width of between about 0.003 and about 0.020 inch wide. A series of depressions are formed in the high thread pressure flank.

An advantage of the present invention is providing a threaded fastener for plastics that reduces internal stresses and increases the pull out tensile load for the fastener.

Another advantage of the present invention is providing a threaded fastener for use in plastics and other soft materials that drives easily yet clamps securely within the material when tightened.

Still another advantage of the present invention is providing a threaded fastener for plastics which resist loosening from vibration or plastic creep.

A still further advantage of the present invention is providing a screw thread design of improved performance in plastic that can be scaled for application on different screw sizes.

Other features and advantages of the invention will become apparent to those skilled in the art upon review of the following detailed description, claims and drawings in which like numerals are used to designate like features.

Figure 1:
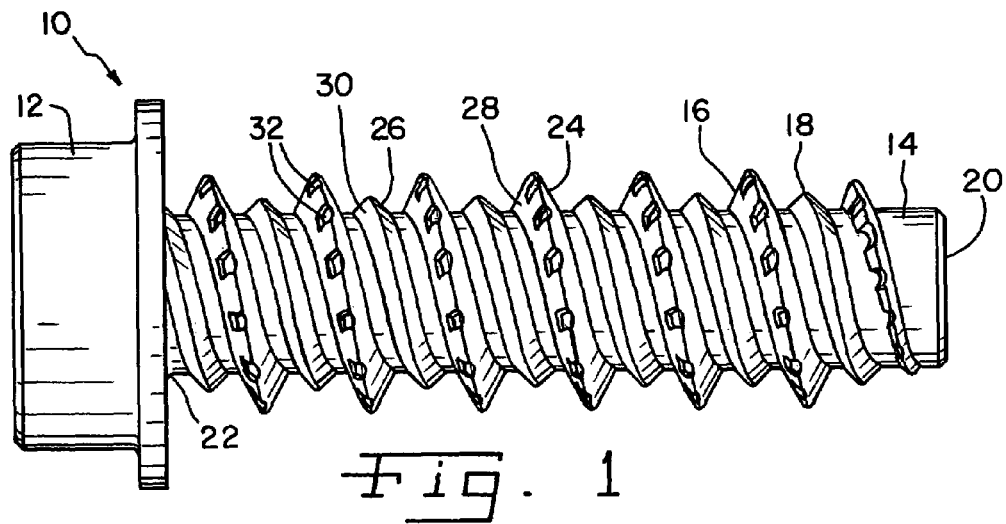
FIG. 1 is an elevated view of a threaded fastener in accordance with the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more particularly to the drawings and specifically to FIG. 1 thereof, a threaded fastener 10 in accordance with the present invention is shown. Fastener 10 includes a head 12 on a shank 14, shank 14 having formed thereon a high thread 16 and a low thread 18. High thread 16 and low thread 18 extend from a distal end 20 of shank 14 in an alternating spiral fashion along the length of shank 14 to a head end 22 thereof adjacent head 12.

Threaded fastener 10 can be formed of a variety of materials and advantageously can be formed of metal in a cold forming process. Fastener 10 can be provided in a variety of different sizes and lengths depending on the application and use for fastener 10. The present invention can be advantageously applied to various sizes of fastener 10, as will be explained hereinafter.

High thread 16 and low thread 18 are shown in the drawings to extend from distal end 20 to head 12. However, in some applications and uses of the present invention, either or both can be provided less than the full distance of shank 14. For example, threads 16 and 18 may start inwardly of distal end 20 and may terminate spaced from head 12 such that a nonthreaded portion is provided on shank 14 either adjacent distal end 20, adjacent head 12 or adjacent both.

Head 12 can be provided in a variety of configurations suitable for connecting to and driving by a tool or implement. For example, head 12 can include a hole formed therein for receiving a suitable wrench or hand or power tool for rotating fastener 12 during insertion of the fastener in a body for anchoring. Head 12 may be configured with a slot or other shaped hole for receiving a screwdriver or other implement. Further, head 12 can be configured with an outer head shape having flat sides for engagement by a wrench or other similar tool. Further, head 12 can have a conical shape for settling onto a concave hole for recessing head 12 in the material in which it is anchored. All such configurations and variations thereof for head 12 are well known to those skilled in the art, and will not be described in further detail herein.

In cross-section, high thread 16 and low thread 18 are frustum shaped. Each has a drive flank 24 and 26, respectively, and a pressure flank 28 and 30, respectively. Drive flanks 24 and 26 are those continuous surfaces of threads 16 and 18, respectively, that generally face toward distal end 20. Pressure flanks 28 and 30 are those continuous surfaces of threads 16 and 18, respectively, that generally face toward head 12.

As suggested by the terminology, high thread 16 extends radially outwardly further from shank 14 then does low thread 18.

High thread 16 is provided with a series of cavities or depressions 32 in pressure flank 28. Advantageously depressions 32 are spaced consistently in high thread 16 generally from head end 22 to distal end 20. In a modification of the present invention, depressions 32 can be provided in one or several helix wraps of high thread 16 adjacent head 12, or in the helical wraps of thread 16 nearest head 12 if thread 16 is spaced some distance from head 12.

To later describe various physical relationships of features in threaded fastener 10, some of the dimensions thereof will be defined with reference to FIGS. 2–6. The longitudinal axis of fastener 10 is illustrated by dashed line 40. The radius of shank 14 is illustrated by arrowed line 42. Radius 42 is one-half the minor diameter ($\varnothing_{min}$) of fastener 10, which is the diameter of shank 14. High thread 16 defines a major diameter ($\varnothing_{hi}$) which is twice the high thread radius indicated by dashed line 44 in FIG. 2. Low thread 18 defines a major diameter ($\varnothing_{lo}$), which is twice the low thread radius indicated by arrowed line 46 in FIG. 2. High thread 16 defines an included angle ($\alpha_h$) indicated by arrowed line 48, and low thread 18 defines and included angle ($\alpha_l$) indicated by arrowed line 50. The angles at which high thread 16 and low thread 18 are provided on shank 14 define the thread pitch, or axial spacing between adjacent portions of each thread. Arrowed line 52 indicates the thread pitch in the exemplary embodiment.

High thread 16 and low thread 18 have flattened thread crests 62 and 64, respectively. The width ($f_c$) of crest flats 62 and 64 is the same for each, and is indicated by arrowed line 66.

Between high thread 16 and low thread 18 a groove flat 68 is defined and is a spiral surface ascending on fastener 10 from distal end 20 to head 12. The width ($f_g$) of groove flat 68 is indicated by arrowed line 70.

Figure 2:
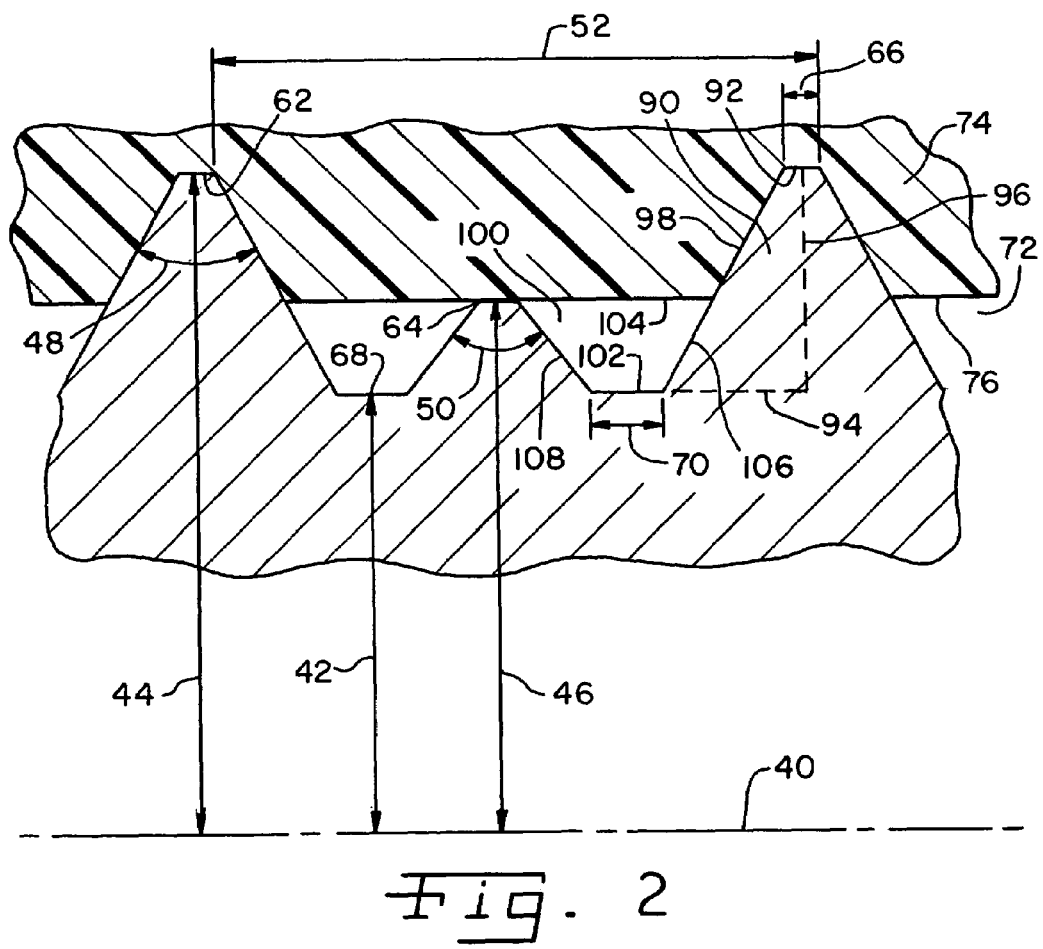
FIG. 2 is an enlarged, fragmentary, cross-sectional view of the threaded fastener shown in FIG. 1 positioned in a pilot hole in anchoring material.
Figure 3:
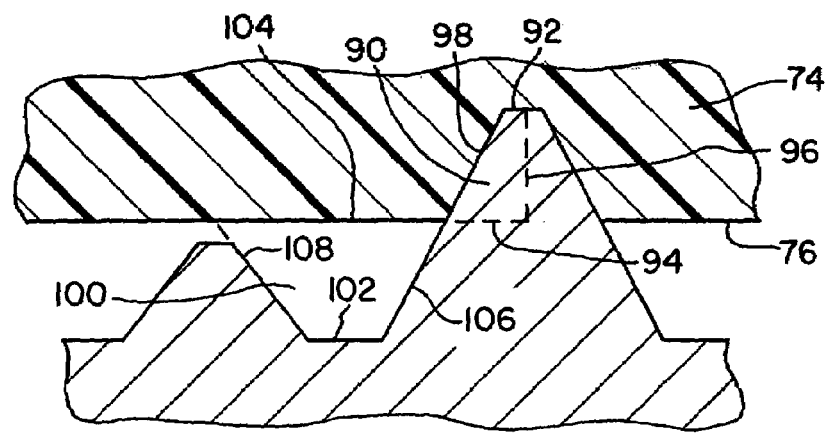
FIG. 3 is an enlarged, fragmentary, cross-sectional view similar to FIG. 2, but illustrating a different portion of the fastener in a different portion of the pilot hole.

Fastener 10 is used in a pilot hole 72 in plastic anchoring material 74, pilot hole 72 being defined by a pilot hole wall 76. As is known to those skilled in the art, pilot hole 72 may be tapered, such as at an included angle of about one degree. Thus, a pilot hole diameter ($\varnothing_{hole}$) will differ at different depths in pilot hole 72. At the location illustrated in FIG. 2, pilot hole diameter ($\varnothing_{hole}$) is approximately equal to the low thread 18 major diameter ($\varnothing_{lo}$). FIG. 3 illustrates an area of fastener 10 that is more shallow in pilot hole 72, whereat the pilot hole diameter ($\varnothing_{hole}$) is slightly larger than the low thread major diameter ($\varnothing_{lo}$). In a deeper portion of pilot hole 72, shown in FIG. 4, pilot hole diameter ($\varnothing_{hole}$) is less than low thread major diameter ($\varnothing_{lo}$).

High thread included angle ($\alpha_h$) 48 is preferably between about 35° and about 60°, and optimally is about 48°. Low thread included angle ($\alpha_l$) 50 is preferably between about 30° and about 120° and optimally is about 90°. The width ($f_g$) of groove flat 68 is preferably between about 0.003 and about 0.020 inch, and optimally is about 0.005 inch. The width ($f_c$) of crest flats 62 and 64 on each high thread 16 and low thread 18 is preferably between about 0.002 inch and about 0.010 inch. The ratio of the diameter ($\varnothing_{hole}$) of pilot hole 72 to the diameter ($\varnothing_{hi}$) of high thread 16 preferably is within the range of about 55% to 85%, and can be specified as 80% most sizes of fasteners in accordance with the present invention.

Figure 5:
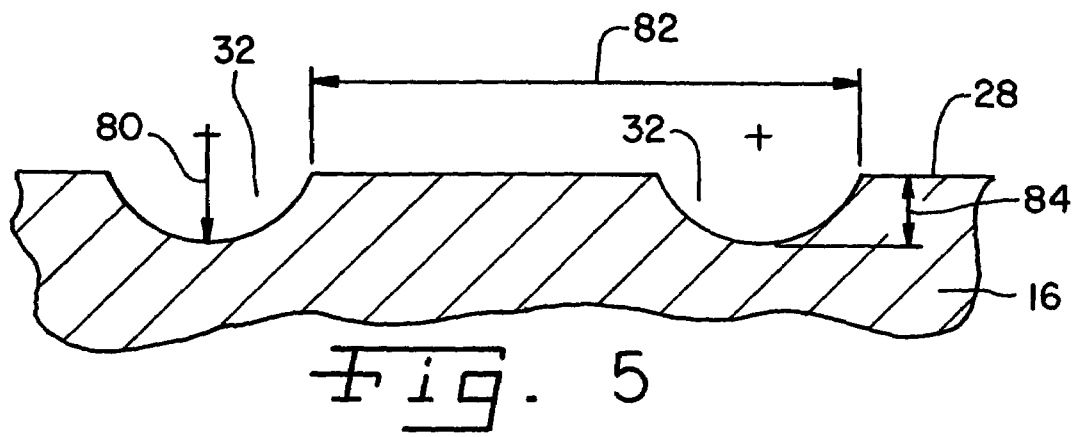
FIG. 5 is an enlarged, cross-sectional view of a portion of the threaded fastener, illustrating a feature provided on the pressure flank of the high thread of the fastener, the cross-section having been taken along the thread length.
Figure 6:
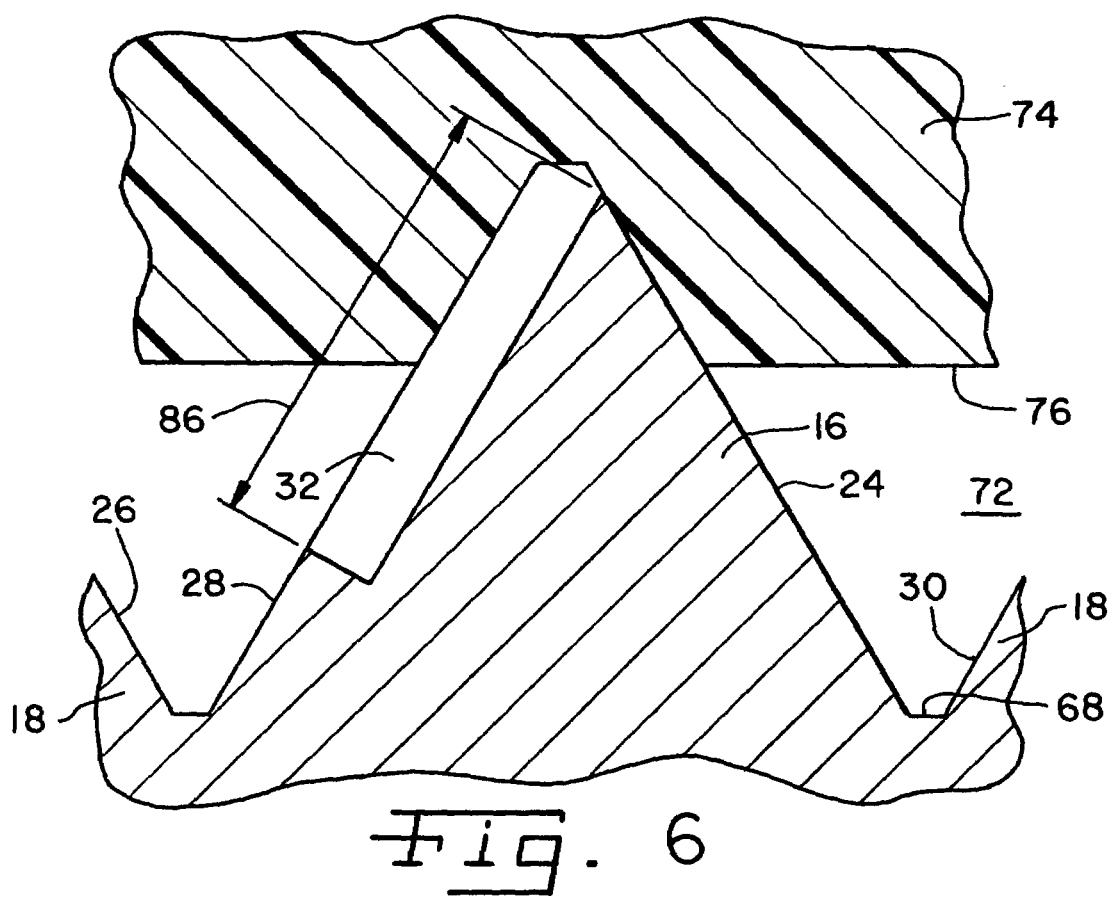
FIG. 6 is an enlarged, fragmentary, cross-sectional view similar to FIG. 2–4, illustrating the pressure flank feature.

Details of the size, shape and positioning of depressions 32 are illustrated in FIGS. 5 and 6. FIG. 5 illustrates a portion of pressure flank 28, generally along a curve following the length of thread 16. FIG. 6 is a fragmentary, axial cross-section of fastener 10. Depressions 32 are elongated in a radial direction, and are open at high thread crest 62, extending inwardly therefrom less than the full distance to shank 14. The radius of the curvature at the bottom of each depression 32, indicated by arrowed line 80, optimally is about 0.008 inch. The circumferential space between adjacent depressions 32, indicated by arrowed line 82, preferably is about 0.040 inch. The depth of each depression 32, indicated by arrowed line 84, preferably is about 0.005 inch. The length ($Length_{PFF}$) of each depression 32, indicated by arrowed line 86, preferably is defined by the following mathematical relationship:

$$0 \leq Length_{PFF} \leq \tfrac{1}{3}(\varnothing_{hi} - \varnothing_{min}) * \sec(\tfrac{1}{2}\alpha_h).$$

Other shapes also can be used advantageously for depressions 32. In some uses of the present invention, advantages may be obtained from extending depressions inwardly from crest 62 nearly entirely to shank 14. Also it is contemplated that in some applications of the invention, advantages may be obtained from providing depressions on pressure flank 30 of low thread 18, at least along the outer edge thereof, adjacent crest 64.

It has been discovered that thread pitch, indicated by arrowed line 52, thread heights and other similar dimensions that have been design constants in other fastener designs all can function as variables in scaling the fastener within commonly acceptable fastener sizes. To retain the advantages of the present invention from one size fastener to another size fastener, the relationships between the volume of the trough-like area between adjacent threads and the volume of the threads, and more particularly the volume of material displaced by the threads is considered. These volumes will vary in any given assembly of a fastener in a pilot hole, since the standard pilot hole 72 for plastic material is tapered.

To select the proper thread size and thread pitch, three different situations are considered. Regions defined by the threads and within the trough-like region between threads are considered in two dimensions, substantially in a plane including fastener axis 40. The three situations considered are areas of pilot hole 72 in which the pilot hole diameter ($\varnothing_{hole}$), are equal to, greater than and less than low thread major diameter ($\varnothing_{lo}$).

A first area $A_1$ is designated in the drawings by numeral 90, and can generally be described as representing an area of anchoring material 74 removed by high thread 16 at a location in pilot hole 72 defined in a plane including axis 40. $A_1$ is a substantially trapezoidally shaped region of high thread 16 in the plane, and includes one-half of the area of high thread 16 that is embedded in anchoring material 74. $A_1$ has first and second opposed parallel sides 92 and 94, respectively, parallel to axis 40. First side 92 has a length equal to one-half the width ($f_c$) and extends along crest flat 62 from the edge thereof to the center thereof. Second side 94 of area $A_1$ has a length equal to one-half the thickness of high thread 16 at pilot hole wall 76, and extends from an edge of pilot hole wall 76 within the aforementioned plane to the center of high thread 16. A third side 96 of area $A_1$ is perpendicular to and extends between first and second sides 92 and 94, and has a length equal to the height of high thread 16 from pilot hole wall 76 to high thread crest 62. A fourth side 98 of area $A_1$ is the length that high thread 16 is embedded in anchoring material 74 along a flank of high thread 16. The dimensions of second, third and fourth sides 94, 96 and 98 defining area $A_1$ will differ at different locations along the tapering pilot hole 72, as can be seen by comparing FIGS. 2, 3 and 4.

A second area $A_2$ in the aforementioned plane is designated by numeral 100, and can generally be described as the area defined between high thread 16 and low thread 18, from groove flat 68 to pilot hole wall 76. $A_2$ is a substantially trapezoidally shaped region, having opposed substantially parallel sides substantially parallel to axis 40. A first side 102 of the length ($f_g$) extends along groove flat 68 between high thread 16 and low thread 18. A second side 104 of area $A_2$ extends along the edge of pilot hole wall 76, between a third side 106 and a fourth side 108 to be described. Third side 106 of area $A_2$ extends along high thread 16, from groove flat 68 to pilot hole wall 76. Fourth side 108 of area $A_2$ extends along low thread 18, from groove flat 68 to pilot hole wall 76, and includes any projected length beyond low thread crest 64 to pilot hole wall 76, as shown in FIG. 3. The dimensions of the second, third and fourth sides 104, 106 and 108 defining area $A_2$ will differ at different locations along the tapering pilot hole wall 76.

Figure 4:
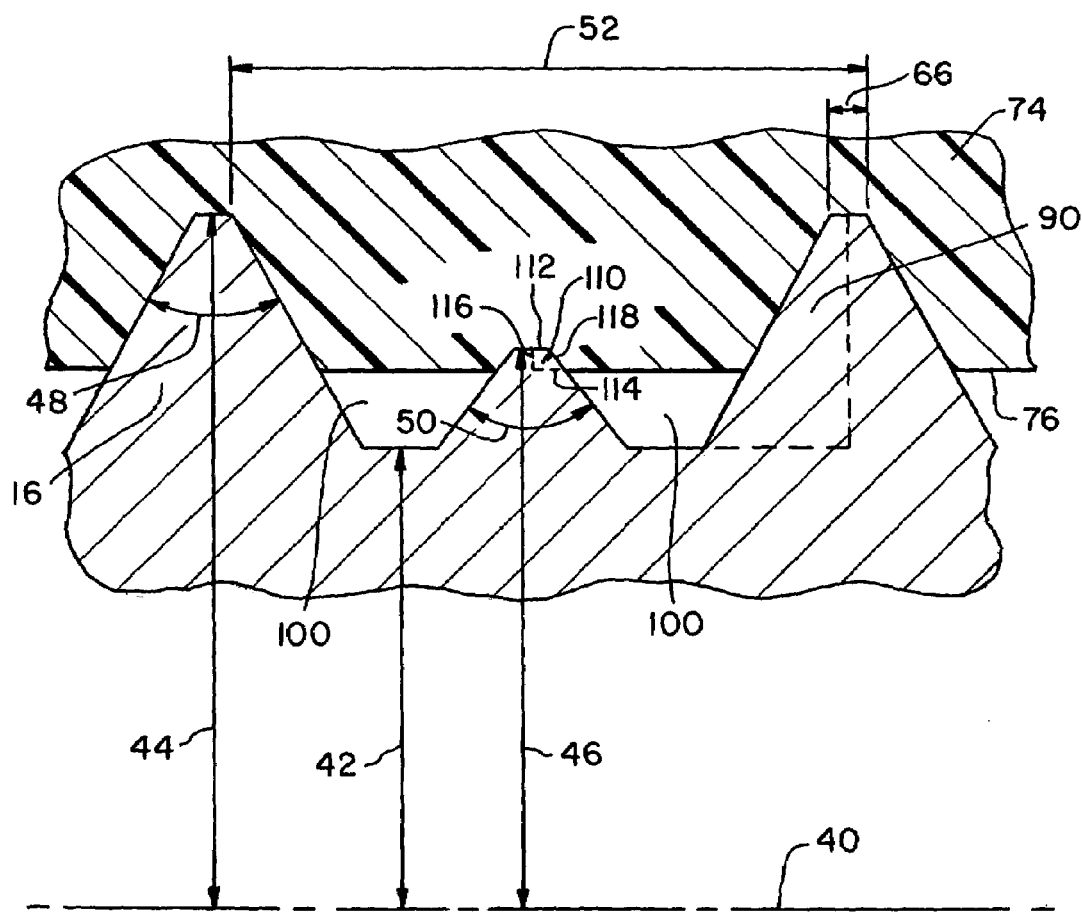
FIG. 4 is an enlarged, fragmentary, cross-sectional view similar to FIGS. 2 and 3, but illustrating yet another portion of the fastener in yet another portion of the pilot hole.

A third area $A_3$ is designated by numeral 110 and is shown in FIG. 4. $A_3$ can generally be described as representing an area of anchoring material 74 removed by low thread 18 at any location in pilot hole 72 where the diameter ($\varnothing_{hole}$) of pilot hole 72 is less than the diameter ($\varnothing_{lo}$) of low thread 18. $A_3$ is a trapezoidally shaped region within low thread 18. $A_3$ has first and second opposed parallel 112 and 114, respectively, parallel to axis 40. First side 112 has a length equal to one-half the width ($f_c$), and extends along low thread crest flat 64 from the edge thereof to the center thereof. Second side 114 of area $A_3$ has a length equal to one-half the thickness of low thread 18 at pilot hole wall 76, and extends from an edge of pilot hole wall 76 within the aforementioned plane to the center of low thread 18. A third side 116 of area $A_3$ is perpendicular to and extends between first and second sides 112 and 114, and has a length equal to the height of low thread 18 from pilot hole wall 76 to low thread crest 64. A fourth side 118 of area $A_3$ extends between first side 112 and second side 114 along the portion of low thread 18 embedded in anchoring material 74. The dimensions of second, third and fourth sides 114, 116 and 118 defining area $A_3$ will differ at different locations along the tapering pilot hole 72.

A mathematical analysis was performed, to define parameters to be used in scaling the invention for fasteners of different sizes. In the first case, the diameter ($\varnothing_{hole}$) of pilot hole 72 is equal to or greater than the diameter ($\varnothing_{lo}$) of low thread 18. FIGS. 2 and 3 illustrate situations representative of the first case.

Given that the area of a trapezoid is equal to $\frac{1}{2}(b_1+b_2)\ast h$ then:

$$A_1 = \tfrac{1}{2}(\tfrac{1}{2}f_c + x_i)\ast h_i \qquad \text{Eq. 1.}$$

$$x_i = \tfrac{1}{2}f_c + h_i \ast \tan(\tfrac{1}{2}\alpha_h) \qquad \text{Eq. 2.}$$

$$h_i = \tfrac{1}{2}(\varnothing_{hi} - \varnothing_{hole}) \qquad \text{Eq. 3.}$$

$$A_2 = \tfrac{1}{2}(f_g + x_2)\ast h_2 \qquad \text{Eq. 4.}$$

$$x_2 = h_2 \ast \tan(\tfrac{1}{2}\alpha_l) + f_g + h_2 \ast \tan(\tfrac{1}{2}\alpha_h) \qquad \text{Eq. 5}$$

$$h_2 = \tfrac{1}{2}(\varnothing_{hole} - \varnothing_{min}) \qquad \text{Eq. 6.}$$

Substituting Eq. 2 and 3 into Eq. 1 implies:

$$A_1 = \tfrac{1}{2}[\tfrac{1}{2}f_c + (\tfrac{1}{2}f_c + \tfrac{1}{2}(\varnothing_{hi} - \varnothing_{hole})\ast\tan(\tfrac{1}{2}\alpha_h))] \ast \tfrac{1}{2}(\varnothing_{hi} - \varnothing_{hole})$$

$$A_1 = \tfrac{1}{4}(\varnothing_{hi} - \varnothing_{hole})(f_c + \tfrac{1}{2}(\varnothing_{hi} - \varnothing_{hole})\ast\tan(\tfrac{1}{2}\alpha_h)) \qquad \text{Eq. 7.}$$

Substituting Eq. 5 and 6 into Eq. 4 implies:

$$A_2 = \tfrac{1}{2}[f_g + (f_g + \tfrac{1}{2}(\varnothing_{hole} - \varnothing_{min})\ast\tan(\tfrac{1}{2}\alpha_l) + \tfrac{1}{2}(\varnothing_{hole} - \varnothing_{min})\ast\tan(\tfrac{1}{2}\alpha_h))]\ast\tfrac{1}{2}(\varnothing_{hole} - \varnothing_{min})$$

$$A_2 = \tfrac{1}{4}(\varnothing_{hole} - \varnothing_{min})[2f_g + \tfrac{1}{2}(\varnothing_{hole} - \varnothing_{min})\ast(\tan(\tfrac{1}{2}\alpha_l) + \tan(\tfrac{1}{2}\alpha_h))] \qquad \text{Eq. 8.}$$

Therefore, the mathematical relationships that define a fastener of the present invention for Case 1 are as follows:

$$A_1 = \tfrac{1}{4}(\varnothing_{hi} - \varnothing_{hole})(f_c + \tfrac{1}{2}(\varnothing_{hi} - \varnothing_{hole})\ast\tan(\tfrac{1}{2}\alpha_h)) \qquad 1.$$

$$A_2 = \tfrac{1}{4}(\varnothing_{hole} - \varnothing_{min})[2f_g + \tfrac{1}{2}(\varnothing_{hole} - \varnothing_{min})\ast(\tan(\tfrac{1}{2}\alpha_l) + \tan(\tfrac{1}{2}\alpha_h))] \qquad 2.$$

$$A_2 \geq A_1 \qquad 3.$$

In a second analysis of the invention, referred to as case 2, the relationships were analyzed at a location at which the diameter ($\varnothing_{hole}$) of pilot hole 72 is less than the diameter ($\varnothing_{lo}$) of low thread 18. This situation occurs relatively deeply in a standard tapered pilot hole, and is illustrated in FIG. 4. The outer tip of low thread 18 is embedded in the anchoring material.

Again, given that the area of a trapezoid is equal to $\frac{1}{2}(b_1+b_2)\ast h$ then:

$$A_1 = \tfrac{1}{2}(\tfrac{1}{2}f_c + x_i)\ast h_i \qquad \text{Eq. 1.}$$

$$x_i = \tfrac{1}{2}f_c + h_i\ast\tan(\tfrac{1}{2}\alpha_h) \qquad \text{Eq. 2.}$$

$$h_i = \tfrac{1}{2}(\varnothing_{hi} - \varnothing_{hole}) \qquad \text{Eq. 3.}$$

$$A_2 = \tfrac{1}{2}(f_g + x_2)\ast h_2 \qquad \text{Eq. 4.}$$

$$x_2 = h_2\ast\tan(\tfrac{1}{2}\alpha_l) + f_g + h_2\ast\tan(\tfrac{1}{2}\alpha_h) \qquad \text{Eq. 5}$$

$$h_2 = \tfrac{1}{2}(\varnothing_{hole} - \varnothing_{min}) \qquad \text{Eq. 6.}$$

$$A_3 = \tfrac{1}{2}(\tfrac{1}{2}f_c + x_3)\ast h_3 \qquad \text{Eq. 7.}$$

$$x_3 = \tfrac{1}{2}f_c + h_3\ast\tan(\tfrac{1}{2}\alpha_l) \qquad \text{Eq. 8.}$$

$$h_3 = \tfrac{1}{2}(\varnothing_{lo} - \varnothing_{hole}) \qquad \text{Eq. 9.}$$

Substituting Eq. 2 and 3 into Eq. 1 implies:

$$A_1 = \tfrac{1}{2}[\tfrac{1}{2}f_c + (\tfrac{1}{2}f_c + \tfrac{1}{2}(\varnothing_{hi} - \varnothing_{hole})\ast\tan(\tfrac{1}{2}\alpha_h))]\ast\tfrac{1}{2}(\varnothing_{hi} - \varnothing_{hole})$$

$$A_1 = \tfrac{1}{4}(\varnothing_{hi} - \varnothing_{hole})(f_c + \tfrac{1}{2}(\varnothing_{hi} - \varnothing_{hole})\ast\tan(\tfrac{1}{2}\alpha_h)) \qquad \text{Eq. 10.}$$

Substituting Eq. 5 and 6 into Eq. 4 implies:

$$A_2 = \tfrac{1}{2}[f_g + (f_g + \tfrac{1}{2}(\varnothing_{hole} - \varnothing_{min})\ast\tan(\tfrac{1}{2}\alpha_l) + \tfrac{1}{2}(\varnothing_{hole} - \varnothing_{min})\ast\tan(\tfrac{1}{2}\alpha_h))]\ast\tfrac{1}{2}(\varnothing_{hole} - \varnothing_{min})$$

$$A_2 = \tfrac{1}{4}(\varnothing_{hole} - \varnothing_{min})[2f_g + \tfrac{1}{2}(\varnothing_{hole}\varnothing_{min})\ast(\tan(\tfrac{1}{2}\alpha_l) + \tan(\tfrac{1}{2}\alpha_h))] \qquad \text{Eq. 11.}$$

Substituting Eq. 8 and 9 into Eq. 7 implies:

$$A_3 = \tfrac{1}{2}[\tfrac{1}{2}f_c + (\tfrac{1}{2}f_c + \tfrac{1}{2}(\varnothing_{lo} - \varnothing_{hole})\ast\tan(\tfrac{1}{2}\alpha_l))]\ast\tfrac{1}{2}(\varnothing_{lo} - \varnothing_{hole})$$

$$A_3 = \tfrac{1}{4}(\varnothing_{lo} - \varnothing_{hole})(f_c + \tfrac{1}{2}(\varnothing_{lo} - \varnothing_{hole})\ast\tan(\tfrac{1}{2}\alpha_l)) \qquad \text{Eq. 12.}$$

Therefore, the mathematical relationships that define a fastener of the present invention for Case 2 are as follows:

$$A_1 = \tfrac{1}{4}(\varnothing_{hi} - \varnothing_{hole})(f_c + \tfrac{1}{2}(\varnothing_{hi} - \varnothing_{hole})\ast\tan(\tfrac{1}{2}\alpha_h)) \qquad 1.$$

$$A_2 = \tfrac{1}{4}(\varnothing_{hole} - \varnothing_{min})[2f_g + \tfrac{1}{2}(\varnothing_{hole} - \varnothing_{\varnothing min})\ast(\tan(\tfrac{1}{2}\alpha_l) + \tan(\tfrac{1}{2}\alpha_h))] \qquad 2.$$

$$A_3 = \tfrac{1}{4}(\varnothing_{lo} - \varnothing_{hole})(f_c + \tfrac{1}{2}(\varnothing_{lo} - \varnothing_{hole})\ast\tan(\tfrac{1}{2}\alpha_l)) \qquad 3.$$

$$A_2 \geq A_1 + A_3 \qquad 4.$$

As can be seen from the above, for given values of included angles 48 and 50, major radii 44 and 46, minor radius 42 and thread crests 62 and 64 thread pitch 52 can be varied to provide an appropriate groove flat 68 to satisfy the above relationships. Similarly, if it is desired to provide a specific thread pitch 52, others of the dimensional relationships can be varied to satisfy the above relationships and provide a fastener having the advantages of the present invention. So long as the trough-like area between high thread 16 and low thread 18 is sufficiently large to receive the anchoring material removed by high thread 16 and low thread 18, the fastener of the present invention will drive easily and function with the benefits described herein. As the above mathematical analysis indicates, various dimensions of the fastener can be modified in conjunction with other dimensions, to achieve the desired results. Changes in thread pitch can be used to change the length of side 102 in $A_2$, thus affecting the total area in $A_2$, and the volume of the trough-like area between threads 16 and 18.

In the use of the present invention, pilot hole 72 is formed in a body of anchoring material 74 by drilling or the like. Fastener 10 is positioned in pilot hole 72, and rotated to advance into the pilot hole. High thread 16 cuts into wall 76 of pilot hole 72 in anchoring material 71, moving material therefrom into the trough like volume between high thread 16 and low thread 18. In regions where the diameter ($\varnothing_{hole}$) of pilot hole 72 is less than the diameter ($\varnothing_{lo}$) of low thread 18, low thread 18 also cuts into wall 76 of pilot hole 72, moving anchoring material 74 from wall 76 into the trough-like volume between high thread 16 and low thread 18. The configuration of fastener 10, with twin thread leads for high thread 16 and low thread 18, reduces material displacement and reduces internal stresses as fastener 10 is worked into pilot hole 72. At the same time, the tensile load necessary to result in pullout of fastener 10 from the anchoring material is increased. Thus, a more secure joint is formed.

Depressions 32 on pressure flank 28 do not contact anchoring material 74 as fastener 10 is driven, and therefore depressions 32 do not affect the torque required for inserting fastener 10. Depressions 32 come into performance only as and after fastener 10 is tightened in place. As clamping pressure is applied through final tightening of fastener 10, the plastic anchoring material surrounding high thread 16 tends to flow into depressions 32. This torque-absorbing feature of the present invention increases the torque required for strip out as compared to convention fasteners without depressions 32. As a result, fasteners in accordance with the present invention provide a high drive-strip window, in that strip-out torque is increase.

In testing performed with M4 screws driven into an ABS boss having a 3.5 mm pilot hole, fasteners of the present invention provided a drive-strip window of 17.3 in/lbs, whereas known conventional screws each provided drive-strip windows of 10.1 in/lbs. Similar testing was performed in unfilled polypropylene, acetal celcon M90 and thirty-percent glass filled PBT celanex 3300. Fasteners of the present invention had increased drive-strip windows of 48%, 35% and 59%, respectively, as compared to known fasteners.

Fasteners of the present invention remain tightened in the material, even as plastic creep and vibration occur. Over time, the filling of depressions 32 is enhanced further by plastic creep, as fastener 10 remains positioned in the anchoring material. Instead of plastic creep causing a loosening of the joint, as has occurred with known fasteners for plastics, with the fastener of the present invention plastic creep serves to increase retention of fastener 10 in the material. So also, vibration does not loosen the joint but instead tends to force the plastic material into depressions 32, thereby further enhancing fixation of fastener 10 in the anchoring material. The effects of time, temperature and vibration all function to strengthen the interlock between fastener 10 and the material in which it is anchored.

To loosen fastener 10 from the material in which it is anchored, relatively higher force is necessary to force depressions 32 past the plastic material that has settled therein. Thus, an increased "breaking" force is required to unseat fastener 10 from the material in which it is embedded, as compared to known fasteners not having depressions 32.

Tests were performed to compare the torque required to loosen fasteners of the present invention to the torque required to loosen other known fasteners. The tests were performed in unfilled ABS plastic, unfilled polypropylene, acetal celcon M90 and thirty-percent glass filled PBT celanex 3300. At ambient temperatures, fasteners of the present invention had increased loosening torque requirements of 86%, 134%, 139% and 33%, respectively, as compared to known fasteners. When heat cycling the same materials, fasteners of the present invention demonstrated increased loosening torque requirements of 447%, 331%, 247% and 73%, respectively, as compared to known fasteners.

The dual thread, high low feature of the present fastener facilitates the use of deep, coarsely spaced threads, providing a heavier shear area and deeper thread engagement in the plastic or other material in which the fastener is embedded. These also further enhance the performance of the fastener 10.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A male threaded fastener, comprising:
   a shank having a head end and a distal end, said distal end defining the leading end of said fastener;
   a first thread spirally wrapping said shank and ascending on said shank from said distal end towards said head end;
   a second thread spirally wrapping said shank and ascending on said shank from said distal end toward said head end;
   said first thread having a drive flank with a substantially flat face facing said distal end and a pressure flank facing said head end; and
   a series of spaced apart depressions formed in said pressure flank and not in said drive flank.

2. The fastener of claim 1, said first thread defining a first major diameter of said fastener and said second thread defining a second major diameter of said fastener, said first major diameter being greater than said second major diameter.

3. The fastener of claim 1, said first thread defining a first thread included angle between said pressure flank and said drive flank, said first thread included angle being between about 35° and about 60°.

4. The fastener of claim 3, said included angle being approximately 48°.

5. The fastener of claim 1, said second thread having a second thread pressure flank facing said head and a second Thread drive flank facing said distal end, said second thread defining a second thread included angle between said second thread drive flank and said second thread pressure flank, said second thread included angle being between approximately 30° and approximately 120°.

6. The threaded fastener of claim 5, said second thread included angle being approximately 90°.

7. The fastener of claim 1, said first and said second threads being spaced from each other on said shaft by a distance of between about 0.003 inch and about 0.020 inch.

8. The fastener of claim 7, said distance being approximately 0.005 inch.

9. The fastener of claim 1, said first thread having a flat thread crest having a width of between about 0.002 inch and approximately 0.010 inch.

10. The fastener of claim 1, said second thread having a flat thread crest having a width of between approximately 0.002 inch and approximately 0.010 inch.

11. A male threaded fastener, comprising:
    a shank having a head end and a distal end, said distal end defining the leading end of said fastener;

a first thread spirally wrapping said shank and ascending on said shank from said distal end towards said head end;

a second thread spirally wrapping said shank and ascending on said shank from said distal end toward said head end;

said first thread having a drive flank facing said distal end and a pressure flank facing said head end; and a series of depressions formed in said pressure flank, said depressions having rounded bottoms formed on a radius of approximately 0.008 inch.

12. A male threaded fastener, comprising:

a shank having a head end and a distal end, said distal end defining the leading end of said fastener;

a first thread spirally wrapping said shank and ascending on said shank from said distal end towards said head end;

a second thread spirally wrapping said shank and ascending on said shank from said distal end toward said head end;

said first thread having a drive flank facing said distal end and a pressure flank facing said head end; and a series of depressions formed in said pressure flank, said depressions spaced from adjacent said depressions by at least about 0.040 inch.

13. A male threaded fastener, comprising:

a shank having a head end and a distal end, said distal end defining the leading end of said fastener;

a first thread spirally wrapping said shank and ascending on said shank from said distal end towards said head end;

a second thread spirally wrapping said shank and ascending on said shank from said distal end toward said head end;

said first thread having a drive flank facing said distal end and a pressure flank facing said head end; and a series of depressions formed in said pressure flank, said depressions having adept of approximately 0.005 inch.

14. A male threaded fastener, comprising:

a shank having a head end and a distal end, said distal end defining the leading end of said fastener;

a first thread spirally wrapping said shank and ascending on said shank from said distal end towards said head end;

a second thread spirally wrapping said shank and ascending on said shank from said distal end toward said head end;

said first thread having a drive flank facing said distal end and a pressure flank facing said head end; and a series of depressions formed in said pressure flank, said depressions having lengths less than or equal to the value;

$$\tfrac{1}{3}(\emptyset_{hi}-\emptyset_{min})*\sec(\tfrac{1}{2}\acute{\alpha}_h)$$

where $\emptyset_{hi}$ is a diameter of said first thread, $\emptyset_{min}$ is a diameter of said shank, and $\acute{\alpha}_h$ is an included angle defined by said drive flank and said pressure flank of said first thread.

15. An assembly of a screw in a pilot hole of a plastic work piece, said assembly comprising:

said pilot hole having a pilot hole wall in said work piece, said pilot hole having a diameter;

said screw having a shank with a diameter;

said screw having a high thread on said shank defining a first major diameter of said screw, said high thread having a high thread pressure flank ad a high thread driving flank defining an included angle of between about 35° and about 60°;

said screw having a low thread on said shank defining a second major diameter of said thread, said second major diameter being less than said first major diameter, and said low thread having a low thread pressure flank and a low Thread driving flank defining a low thread included angle of between about 30° and about 120°;

said high and low threads having substantially flat crests having a crest width;

said high ad low threads being spaced on said shank by a groove flat distance; and said assembly satisfying the relationship:

$A_2>A_1$, where:

$A_1$ is the area of a substantially trapezoidal first region of said high thread defined in a plane containing an axis of said screw, said first region having first, second, third and fourth sides in said plane on a same side of said axis, said first and second sides being parallel to said axis, said first side extending along said high thread crest from an edge thereof to the center thereof, said second side having a length equal to one-half the thickness of said high thread at said pilot hole wall and extending from an edge of said high thread within the aforementioned plane to the center of said high thread, said third side being perpendicular to and extending between first and second sides through said high thread and said fourth side extending between said first and second sides along a flank of said high thread; and $A_2$ is the area of a second substantially trapezoidal region defined in said plane, between said high thread and said low thread from said groove flat to said pilot hole wall, said second region having second region first second, third and fourth sides on said same side of said axis, said second region, first, and second sides being substantially parallel to said axis, said second region first side extending along said groove flat from said high to said low thread, said second region second side extending along said edge of said pilot hole wall between said second region third side and fourth sides, said second region third side extending along said high thread from said groove flat to said pilot hole wall, and said second region fourth side extending along said low thread from said groove flat to said pilot hole wall.

16. The assembly of claim 15, further satisfying the relationship:

$A_2 \leq A_1 + A_3$, where:

$A_3$ is the area of a substantially trapezoidal third region of said low thread defined in said plane, said third region having third region first, second, third and fourth sides in said plane on said same side of said axis, said third region first and second sides being parallel to said axis, said third region first side extending along said low thread crest from an edge thereof to the center thereof, said third region second side having a length equal to one-half the thickness of said low thread at said pilot hole wall and extending from an edge of said low thread within said plane to the center of said low thread, said third region third side being perpendicular to and extending between first and second sides through said low thread, and said third region fourth side extending between said third region first and second sides along a flank of said low thread.

17. The assembly of claim 15, said high thread included angle being about 48°.

18. The assembly of claim 15, said low thread included angle being about 90°.

19. The assembly of claim 18, said high thread included angle being about 48°.

20. A male threaded fastener; comprising:
a shank having a head end and a distal end, said distal end defining the leading end of said fastener;
a high thread spirally wrapping said shank, said high thread having a drive flank facing said distal end and a pressure flank facing said head end, said flanks defining a high thread included angle of between about 35° and about 60°;
a low thread spirally wrapping said shank; said low thread having a low thread drive flank facing said distal end and a low thread pressure flank facing said head end, said low thread flanks defining a low thread included angle of between about 30° and about 120°;
said high and low threads each having flat crests between about 0.002 and about 0.010 inch wide;
said high and low threads being spaced from each other on said shank by a groove flat width of between about 0.003 and about 0.020 inch; and
a series of depressions formed in said high thread pressure flank.

21. The fastener of claim 20, said depressions having rounded bottoms formed on a radius of approximately 0.008 inch.

22. The fastener of claim 20, said depressions spaced from adjacent said depressions by at least about 0.040 inch.

23. The fastener of claim 20, said depressions having a depth of approximately 0.005 inch.

24. The fastener of claim 20, said depressions having lengths less than or equal to the value:

$$\tfrac{1}{3}(\varnothing_{hi}-\varnothing_{min})*\sec(\tfrac{1}{2}\alpha_h), \text{ wherein}$$

$\varnothing_{hi}$ is a diameter of said high thread, $\varnothing_{min}$ is a diameter of said shank, $\alpha_h$ is an included angle defined by said high thread drive flank and said high thread pressure flank.

* * * * *